(12) United States Patent
Chen et al.

(10) Patent No.: US 12,344,781 B2
(45) Date of Patent: Jul. 1, 2025

(54) CARBON NANODOT-FLUORESCENT POLYMER COMPOSITE, AND METHOD FOR PREPARING AND FIBER INCLUDING THE SAME

(71) Applicant: TAINAN SPINNING CO., LTD., Tainan (TW)

(72) Inventors: Wei-Yu Chen, Tainan (TW); Ya-Yun Ho, Tainan (TW); Cheng-Ho Chen, Tainan (TW); Zong-Han Wu, Tainan (TW); Chia-Yang Wu, Tainan (TW); Yen-Chou Chen, Tainan (TW)

(73) Assignee: TAINAN SPINNING CO., LTD., Tainan City (TW)

( * ) Notice: Subject to any disclaimer, the term of this patent is extended or adjusted under 35 U.S.C. 154(b) by 665 days.

(21) Appl. No.: 17/658,328

(22) Filed: Apr. 7, 2022

(65) Prior Publication Data
US 2022/0325172 A1    Oct. 13, 2022

(51) Int. Cl.
| | |
|---|---|
| *C09K 11/02* | (2006.01) |
| *B82Y 20/00* | (2011.01) |
| *B82Y 40/00* | (2011.01) |
| *C08G 63/183* | (2006.01) |
| *C08K 3/04* | (2006.01) |
| *C09K 11/06* | (2006.01) |
| *C09K 11/65* | (2006.01) |
| *D01F 8/14* | (2006.01) |
| *D01F 8/18* | (2006.01) |

(52) U.S. Cl.
CPC ............ *C09K 11/02* (2013.01); *C08G 63/183* (2013.01); *C08K 3/04* (2013.01); *C09K 11/06* (2013.01); *C09K 11/65* (2013.01); *D01F 8/14* (2013.01); *D01F 8/18* (2013.01); *B82Y 20/00* (2013.01); *B82Y 40/00* (2013.01); *C08K 2201/011* (2013.01); *C09K 2211/1425* (2013.01); *D10B 2401/20* (2013.01)

(58) Field of Classification Search
CPC ......... C09K 11/02; C09K 11/06; C09K 11/65; C09K 2211/1425; C08G 63/183; C08K 3/04; C08K 2201/011; D01F 8/14; D01F 8/18; D10B 2401/20
See application file for complete search history.

(56) References Cited

FOREIGN PATENT DOCUMENTS

CN         106117531         * 11/2016

OTHER PUBLICATIONS

Gu et al, "Functionalization of PET with carbon nanopdots as copolymerizble flame retardants for excellent smoke supressants and mechanical propeties", Polymer Degradation and Stability, 195 (2022), 109766, p. 1-15, Nov. 2, 2021.*

* cited by examiner

*Primary Examiner* — C Melissa Koslow
(74) *Attorney, Agent, or Firm* — Osha Bergman Watanabe & Burton LLP

(57) ABSTRACT

A method for preparing a carbon nanodot-fluorescent polymer composite includes subjecting a reactant and a biological component to a reaction at 260° C. to 290° C., so as to obtain the carbon nanodot-fluorescent polymer composite containing a polymer and carbon nanodots dispersed in the polymer. The biological component includes at least one of collagen, chitin, gelatin, and sodium alginate. The reactant is selected from a reaction component or a polycondensate formed therefrom. The reaction component includes terephthalic acid and ethylene glycol capable of reacting with carboxylic acid groups of the terephthalic acid. Also disclosed are the carbon nanodot-fluorescent polymer composite and a carbon nanodot-fluorescent composite fiber including the same.

12 Claims, 6 Drawing Sheets

US 12,344,781 B2

CARBON NANODOT-FLUORESCENT POLYMER COMPOSITE, AND METHOD FOR PREPARING AND FIBER INCLUDING THE SAME

CROSS-REFERENCE TO RELATED APPLICATION

This application claims priority of Taiwanese Invention Patent Application No. 110112887, filed on Apr. 9, 2021.

FIELD

The present disclosure relates to a polymer composite, and more particularly to a carbon nanodot-fluorescent polymer composite. The present disclosure also relates to a method for preparing and a fiber including the carbon nanodot-fluorescent polymer composite.

BACKGROUND

A fluorescent-labeled polymer is produced by incorporating a fluorescent material into a polymer. The fluorescent material can be used to identify, track or mark the origin and trace of the polymer based on the presence of the fluorescent material and the chemical and physical properties thereof. Examples of the fluorescent material may include metallic nanomaterials, organic dyes, etc. The metallic nanomaterials are mostly formed of inorganic metal oxides or rare earth elements. The metallic nanomaterials have disadvantages such as poor photostability, high biological toxicity, high acquisition cost, etc., and the organic dyes have problems such as high biological toxicity and photo and thermal instability. Therefore, a fluorescent material that is environmentally friendly, and that has non-biotoxic and stable fluorescence properties is in demand.

A conventional method for producing the fluorescent-labeled polymer generally involves preparing the polymer and the fluorescent material separately, and then subjecting the polymer to a melting process, followed by mixing the thus molten polymer with the fluorescent material. However, the conventional method has the following problems. The fluorescent material is required to be prepared first before being mixed with the polymer, making the preparation method cumbersome. Moreover, the dispersion of fluorescent material in the polymer is uneven. In addition, carbon nanodots prepared by subjecting a biological material to a hydrothermal or pyrolysis reaction, when mixed with the molten polymer, would form clusters of carbon nanodot aggregates due to poor dispersion in the polymer, such that the thus obtained fluorescent-labeled polymer is not conferred with fluorescence-emitting property and has a significant grainy appearance.

SUMMARY

Therefore, in a first aspect, the present disclosure provides a method for preparing a carbon nanodot-fluorescent polymer composite which can alleviate at least one of the drawbacks of the prior art.

The method includes subjecting a reactant and a biological component to a reaction, so as to obtain the carbon nanodot-fluorescent polymer composite containing a polymer and a plurality of carbon nanodots dispersed in the polymer. The polymer is formed from the reactant, and the carbon nanodots are transformed from the biological component. The reaction is performed at a temperature ranging from 260° C. to 290° C. The biological component includes at least one biological substance selected from the group consisting of collagen, chitin, gelatin, and sodium alginate. The reactant is selected from one of a reaction component and a polycondensate formed by subjecting the reaction component to a condensation reaction. The reaction component includes terephthalic acid and ethylene glycol capable of reacting with carboxylic acid groups of the terephthalic acid.

In a second aspect, the present disclosure provides a carbon nanodot-fluorescent polymer composite, which can alleviate at least one of the drawbacks of the prior art, and which is prepared by the aforesaid method.

In a third aspect, the present disclosure provides a carbon nanodot-fluorescent composite fiber, which can alleviate at least one of the drawbacks of the prior art, and which includes a polymer component including the aforesaid carbon nanodot-fluorescent polymer composite.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
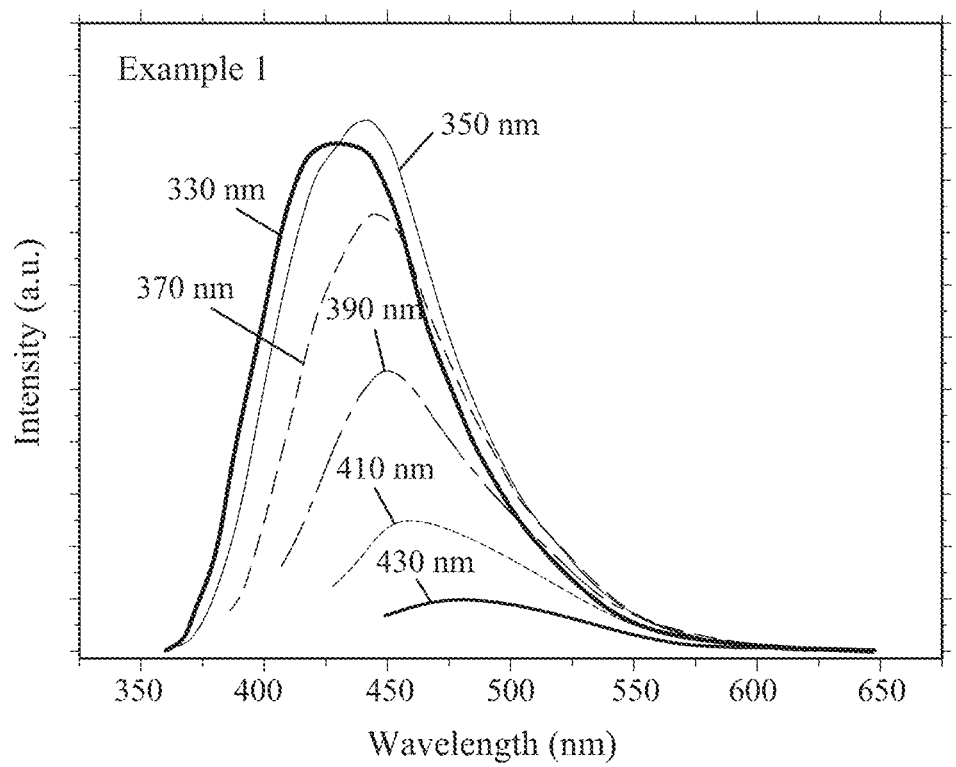
FIG. 1 is a graph illustrating fluorescence spectrum of carbon nanodot-fluorescent polymer composite particles of Example 1 obtained by a preparation method of the present disclosure.

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides a method for preparing a carbon nanodot-fluorescent polymer composite. The method includes subjecting a reactant and a biological component to a reaction, so as to obtain the carbon nanodot-fluorescent polymer composite containing a polymer and a plurality of carbon nanodots dispersed in the polymer. The polymer is formed from the reactant, and the carbon nanodots are transformed from the biological component. The biological component includes at least one biological substance selected from the group consisting of collagen, chitin, gelatin, and sodium alginate. The reactant is selected from one of a reaction component and a polycondensate formed by subjecting the reaction component to a condensation reaction. The reaction component includes a polycarboxylic acid compound, and a reactive compound which is capable of reacting with carboxylic acid groups of the polycarboxylic acid compound and which is selected from a polyol compound or a polyamine compound.

The carboxylic acid groups of the polycarboxylic acid compound are carboxyl groups or carboxylic acid ester groups. An example of the carboxylic acid ester group is alkyl ester group. Examples of the polycarboxylic acid compound may include, but are not limited to, terephthalic acid, isophthalic acid, oxalic acid, malonic acid, succinic acid, glutaric acid, adipic acid, pimelic acid, suberic acid, azelaic acid, sebacic acid, and 1,4-cyclohexanedicarboxylic acid. In certain embodiments, the polycarboxylic acid compound is selected from the group consisting of terephthalic acid, isophthalic acid, oxalic acid, succinic acid, adipic acid, and combinations thereof. In an exemplary embodiment, the polycarboxylic acid compound is terephthalic acid.

Examples of the polyol compound may include, but are not limited to, ethylene glycol, propanediol, butanediol, pentanediol, hexanediol, heptanediol, octanediol, nonanediol, decanediol, 1,4-cyclohexanedimethanol, neopentyl glycol, 3-methyl-1,5,-pentanediol, polyethylene glycol, and polytetramethylene ether glycol. In certain embodiments, the polyol compound is selected from the group consisting of ethylene glycol, propanediol, butanediol, polyethylene glycol, polytetramethylene ether glycol, and combinations thereof. In an exemplary embodiment, the polyol compound is ethylene glycol. In certain embodiments, based on a total molar amount of the reaction component, a molar ratio of the polyol compound to the polycarboxylic acid compound ranges from 50:50 to 70:30.

Examples of the polyamine compound may include, but are not limited to, ethylenediamine, 1,6-hexanediamine, 1,5-pentanediamine, phenylenediamine, and 2-methyl-pentamethylenediamine. In certain embodiments, the polyamine compound is selected from the group consisting of ethylenediamine, 1,6-hexanediamine, 1,5-pentanediamine, and combinations thereof.

According to the present disclosure, when the reaction component includes the polycarboxylic acid compound and the polyol compound, the condensation reaction is one of an esterification reaction and a transesterification reaction, and the polycondensate is an esterified compound or a transesterified compound. When the reaction component includes the polycarboxylic acid compound and the polyamine compound, the condensation reaction is an acylation reaction, and the polycondensate is an amide compound. In certain embodiments, examples of the polycondensate include ethylene terephthalate, propylene terephthalate, butylene terephthalate, etc. In an exemplary embodiment, the polycondensate is ethylene terephthalate. In certain embodiments, the condensation reaction involves a stepwise heating process that includes a first heating stage and a second heating stage conducted after the first heating stage. In certain embodiments, the first heating stage involves heating at a rate of 5° C./min until 250° C., and the second heating stage involves heating at a rate of 10° C./min until 270° C.

In certain embodiments, the biological component is mixed with the reaction component to form a reaction mixture. In certain embodiments, the biological component is mixed with the polycondensate formed from the reaction component, so as to form the reaction mixture. To be specific, the biological component may be mixed with the polycondensate during or after formation of the polycondensate from the reaction component.

In certain embodiments, the collagen has a weight average molecular weight ranging from 110 kDa to 500 kDa. In certain embodiments, the chitin has a weight average molecular weight ranging from 800 kDa to 1500 kDa. In certain embodiments, the gelatin has a weight average molecular weight ranging from 20 kDa to 100 kDa. In certain embodiments, the sodium alginate has a weight average molecular weight ranging from 20 kDa to 200 kDa.

In certain embodiments, in order to confer an improved thermal stability property to the carbon nanodot-fluorescent polymer composite, the reaction component further includes a phosphate-based heat stabilizer added during the preparation of the carbon nanodot-fluorescent polymer composite. The phosphate-based heat stabilizer is present in an amount greater than 0 mol % and not greater than 3 mol %, based on a total molar amount of the reaction component. In certain embodiments, the phosphate-based heat stabilizer is selected from the group consisting of trimethyl phosphate (TMP), triphenyl phosphite (TEP), triphenyl phosphate (TPP), triethyl phosphate (TEPA), and combinations thereof.

According to the present disclosure, when the reactant is the reaction component, the reaction that the reaction mixture is subjected to is the condensation reaction and a polymerization reaction; and when the reactant is the polycondensate, the reaction that the reaction mixture is subjected to is the polymerization reaction. In certain embodiments, the reaction is performed at a temperature ranging from 260° C. to 290° C., and at a final pressure of not greater than 2 torr.

In certain embodiments, the reaction is performed in the presence of a catalyst. Such catalyst is, for example, an organometallic catalyst that is conventionally used in an esterification reaction, a transesterification reaction, a condensation reaction, or a polymerization reaction. Examples of the organometallic catalyst may include, but are not limited to, ethylene glycol antimony and antimony acetate. In an exemplary embodiment, the organometallic catalyst is ethylene glycol antimony. In certain embodiments, the catalyst is present in an amount ranging from 0.02 parts by weight to 0.06 parts by weight, based on a total amount of the reaction component defined as 100 parts by weight.

According to the present disclosure, when the reaction mixture is subjected to the reaction, the biological component is carbonized and passivated by heating to gradually form the carbon nanodots, and the reactant gradually forms the polymer. By simultaneously forming the polymer and the carbon nanodots, the carbon nanodots can be uniformly dispersed in the polymer, such that the carbon nanodot-fluorescent polymer composite does not have a grainy appearance. In addition, since the biological component has merits such as low cost, easy availability, non-toxicity, and being environmentally friendly, the preparation method of the present disclosure is advantageous in terms of low cost and being environmentally friendly. Moreover, in comparison with the conventional method, in which the carbon nanodots and the polymer are prepared separately and then mixing the same to form the carbon nanodot-fluorescent polymer composite, the preparation method of the present disclosure has an advantage of being simple because the polymer and the carbon nanodots can be prepared in a single step. Furthermore, the carbon nanodots are conferred with fluorescence-emitting property, and the fluorescence wavelength can be adjusted according to the molecular weight of the biological component.

The present disclosure also provides a carbon nanodot-fluorescent polymer composite, which is prepared by the abovementioned method.

According to the present disclosure, the carbon nanodot-fluorescent polymer composite includes the polymer and a plurality of the carbon nanodots dispersed in the polymer. The carbon nanodots are present in an amount ranging from 0.00001 parts by weight to 5 parts by weight, based on a total amount of the polymer defined as 100 parts by weight.

In certain embodiments, the carbon nanodot-fluorescent polymer composite has a glass transition temperature ranging from 76° C. to 100° C. In certain embodiments, the carbon nanodot-fluorescent polymer composite has a glass transition temperature ranging from 76° C. to 90° C.

In certain embodiments, the carbon nanodot-fluorescent polymer composite has an acid value not greater than 40 eq KOH/$10^6$ g. In certain embodiments, the carbon nanodot-fluorescent polymer composite has an acid value ranging from 5 eq KOH/$10^6$ g to 40 eq KOH/$10^6$ g.

The present disclosure also provides a carbon nanodot-fluorescent composite fiber, which includes a polymer composite component including the aforesaid carbon nanodot-fluorescent polymer composite.

In certain embodiments, the polymer composite component further includes an organic polymer. In certain embodiments, the organic polymer is selected from the group consisting of polyethylene terephthalate, polybutylene terephthalate, polytrimethylene terephthalate, polyamide, and combinations thereof. In an exemplary embodiment, the organic polymer is polyethylene terephthalate.

According to the present disclosure, a method for preparing the carbon nanodot-fluorescent composite fiber is not particularly limited, and the carbon nanodot-fluorescent composite fiber may be prepared using conventionally known fiber preparation methods.

In certain embodiments, the method for preparing the carbon nanodot-fluorescent composite fiber includes subjecting a raw material including the abovementioned carbon nanodot-fluorescent polymer composite to a spinning treatment. The raw material further includes the aforesaid organic polymer. Namely, the raw material includes the aforesaid polymer composite component. In certain embodiments, the spinning treatment includes a melt-spinning process performed at a temperature ranging from 250° C. to 290° C. In other embodiments, the melt-spinning process of the spinning treatment is performed at a temperature ranging from 260° C. to 280° C.

The present disclosure will be further described by way of the following examples. However, it should be understood that the following examples are intended solely for the purpose of illustration and should not be construed as limiting the present disclosure in practice.

Preparation of Examples and Comparative Examples

Example 1 (EX1)

2600 g of terephthalic acid and 1015 g of ethylene glycol were mixed by stirring in a reactor (Manufacturer: Lucky Seven Industrial Co., Ltd., Taiwan; Model no.: 10 L Autoclave P & ID) at a stirring speed of 60 rpm, and nitrogen gas was introduced into the reactor to replace the air therein, followed by controlling the pressure in the reactor to 2 bar after the air was completely replaced with the nitrogen gas. The temperature of the reactor was controlled at 230° C., and was increased at a rate of 0.3° C. per minute until 270° C. When the distillation rate of water reached not lower than 90% of the theoretical value, 1.6 g of ethylene glycol antimony serving as a catalyst and 300 g of a solution containing 10 wt % of gelatin having a weight average molecular weight of 100 kDa and ethylene glycol were added into the reactor. Thereafter, the pressure in the reactor was decreased to not greater than 2 torr, and the temperature thereof was increased to 280° C., followed by performing a polymerization reaction for 3.5 hours. When the intrinsic viscosity (IV) ranged from 0.62 dL/g to 0.63 dL/g, a cooling treatment was performed in a water bath at room temperature to stop the polymerization reaction, thereby obtaining 2560 g of a carbon nanodot-fluorescent polymer composite of EX1 (having an acid value of 36.9 eq KOH/$10^6$ g) which included a plurality of carbon nanodots and polyethylene terephthalate. The total weight of the carbon nanodots was 30 g, and the yield of the thus obtained carbon nanodot-fluorescent polymer composite was 84.37 wt % ({2560× 100%/[(2600/166.13)×192+30]}). In the carbon nanodot-fluorescent polymer composite of EX1, the carbon nanodots were present in an amount of 1.186 parts by weight, based on a total amount of the polyethylene terephthalate defined as 100 parts by weight. The carbon nanodot-fluorescent polymer composite was then subjected to a dicing treatment, so as to form carbon nanodot-fluorescent polymer composite particles of EX1.

Examples 2 to 4 (EX2 to EX4)

The procedure for preparing the carbon nanodot-fluorescent polymer composite particles of each of EX2 to EX4 was substantially similar to that for EX1, except that the biological substance used for preparing each of EX2 to EX4 is different. In regard to EX2, the biological substance was collagen having a weight average molecular weight of 200 kDa, and 2576 g of a carbon nanodot-fluorescent polymer composite particles having an acid value of 27.1 eq KOH/$10^6$ g was obtained. In the carbon nanodot-fluorescent polymer composite particles of EX2, the carbon nanodots were present in an amount of 1.178 parts by weight, based on a total amount of the polyethylene terephthalate defined as 100 parts by weight. In regard to EX3, the biological substance was chitin having a weight average molecular weight of 1000 kDa, and 2570 g of a carbon nanodot-fluorescent polymer composite particles having an acid value of 38.7 eq KOH/$10^6$ g was obtained. In the carbon nanodot-fluorescent polymer composite particles of EX3, the carbon nanodots were present in an amount of 1.181 parts by weight, based on a total amount of the polyethylene terephthalate defined as 100 parts by weight. In regard to EX4, the biological substance was sodium alginate having a weight average molecular weight of 100 kDa, and 2564 g of a carbon nanodot-fluorescent polymer composite particles having an acid value of 14.6 eq KOH/$10^6$ g was obtained. In the carbon nanodot-fluorescent polymer composite particles of EX4, the carbon nanodots were present in an amount of 1.184 parts by weight, based on a total amount of the polyethylene terephthalate defined as 100 parts by weight.

Comparative Example 1 (CE1)

2 g of collagen and 20 mL of pure water were mixed in a stainless steel high pressure reactor (Manufacturer: EriTec Science Co., Ltd., Taiwan) having an outer diameter of 52 mm×115 mm and an inner diameter of 40 mm×80 mm, and then the high pressure reactor was sealed and placed in an oven to be subjected to heating at 240° C. for 4 hours, thereby obtaining a solution. After that, the solution in the high pressure reactor was subjected to a filtering treatment using diatomaceous earth (Product name: Celite® 545), thereby obtaining a filtrate. Then, the filtrate was subjected to a freeze-drying treatment for 24 hours, so as to obtain a plurality of carbon nanodots. Thereafter, 0.1 g of the carbon nanodots were mixed with 300 g of polyethylene terephthalate to form a mixture. Then, the mixture was placed on a plastograph (Manufacturer: Jian Kwang Machine Industrial Co., Ltd., Taiwan; Model no.: JKMDK25G), and was stirred at 270° C. under a speed of 20 rpm for 5 minutes, thereby forming 290 g of a carbon nanodot-fluorescent polymer composite of CE1 including carbon nanodots present in a total amount of 0.1 g. In the carbon nanodot-fluorescent polymer composite of CE1, the carbon nanodots were present in an amount of 0.0345 parts by weight, based on a total amount of the polyethylene terephthalate defined as 100 parts by weight.

Comparative Example 2 (CE2)

The procedure for preparing the carbon nanodot-fluorescent polymer composite of CE2 was substantially similar to that for CE1, except that the total amount of the carbon nanodots was 0.01 g. In the carbon nanodot-fluorescent polymer composite of CE2, the carbon nanodots were present in an amount of 0.00345 parts by weight, based on a total amount of the polyethylene terephthalate defined as 100 parts by weight.

Preparation of Comparative Application Example and Application Examples

Comparative Application Example 1 (CAE1)

2600 g of terephthalic acid and 1015 g of ethylene glycol were mixed by stirring in a reactor (Manufacturer: Lucky Seven Industrial Co., Ltd., Taiwan; Model no.: 10 L Autoclave P & ID) at a stirring speed of 60 rpm, and nitrogen gas was introduced into the reactor to replace the air therein, followed by controlling the pressure in the reactor to 2 bar after the air was completely replaced with the nitrogen gas. The temperature of the reactor was increased to 270° C. in a stepwise manner, and when the distillation rate of the reaction distillate reached not lower than 90% of the theoretical value, 1.6 g of ethylene glycol antimony serving as a catalyst was added into the reactor. Next, the pressure in the reactor was decreased to not greater than 2 torr, and the temperature thereof was increased to 280° C., followed by allowing a polymerization reaction to proceed for 3.5 hours. When a stirring power of the reactor was increased to 210 W, a discharge treatment was performed. After that, a cooling treatment was performed in a water bath at room temperature, followed by a dicing treatment, thereby obtaining polyethylene terephthalate granules of CAE1 (2594 g) The polyethylene terephthalate granules of CAE1 were placed in a spinning apparatus (Manufacturer: Teijin; Model no.: AW-212/8 POY) including a screw extruder, a tractor, and a winder, and were then subjected to a melting treatment performed at 280° C., so as to form a melt. Next, the extrusion pressure of the screw extruder was set to range from 110 kg/cm$^2$ to 150 kg/cm$^2$, so that the melt passing through a spinneret of the screw extruder ejected a plurality of spun fibers. Thereafter, the spun fibers were subjected to a drafting treatment by passing through the tractor, so as to form a polyethylene terephthalate partially oriented yarn (PET-POY) of CAE1. The parameters of the spinning apparatus for forming the polyethylene terephthalate partially oriented yarn of CAE1 were set as follows: (i) the spinneret had 48 rounded cross-shaped micro-holes, and each microhole had a slit width of 0.05 mm; (ii) the tractor included a first drafting roller and a second drafting roller, and a ratio of the traction speed of the first drafting roller to that of the second drafting roller was 0.995; (iii) a ratio of the traction speed of the second drafting roller to the winding speed of the winder was 1.005; and (iv) the winding angle of the winder was 6 degrees.

Application Example 1 (AE1)

99.5 kg of the polyethylene terephthalate granules of CAE1 was mixed with 0.5 kg of the carbon nanodot-fluorescent polymer composite particles of EX1 to form a mixture, which was then placed in the abovementioned spinning apparatus for preparing CAE1. Next, a melting treatment was performed at 280° C. to form a melt. Thereafter, the extrusion pressure of the screw extruder was set to range from 110 kg/cm$^2$ to 150 kg/cm$^2$, so that the melt passing through the spinneret of the screw extruder ejected a plurality of spun fibers. Then, the spun fibers were subjected to a drafting treatment by passing through the tractor, so as to form a carbon nanodot-fluorescent partially oriented yarn of AE1. The parameters of the spinning apparatus for forming the carbon nanodot-fluorescent partially oriented yarn of AE1 were similar to those described above for forming the polyethylene terephthalate partially oriented yarn of CAE1.

Application Example 2 (AE2)

The procedure for preparing the carbon nanodot-fluorescent partially oriented yarn of AE2 was substantially similar to that for AE1, except that 100 kg of the carbon nanodot-fluorescent polymer composite particles of EX1 was directly placed in the spinning apparatus (i.e., the polyethylene terephthalate granules of CAE1 were omitted). The parameters of the spinning apparatus for forming the carbon nanodot-fluorescent partially oriented yarn of AE2 were similar to those described above for forming the polyethylene terephthalate partially oriented yarn of CAE1.

Property Evaluation

1. Intrinsic Viscosity

With reference to the procedures set forth in ASTM D4603-18 (published in 2018), i.e., Standard Test Method for Determining Inherent Viscosity of Poly(Ethylene Terephthalate) by Glass Capillary Viscometer, a respective one of the carbon nanodot-fluorescent polymer composite particles of EX1 to EX4, the polyethylene terephthalate partially oriented yarn of CAE1, and carbon nanodot-fluorescent partially oriented yarns of AE1 and AE2 was dissolved in a solution containing phenol and tetrachloroethane, and was then subjected to measurement using an Ubbelohde viscometer (Manufacturer: SI Analytics GmbH; Model no.: 53720), followed by calculation of the intrinsic viscosity using an empirical conversion table provided by the manufacturer according to the amount of the solution used. The results are shown in Tables 1 and 2.

2. Glass Transition Temperature ($T_g$) and Melting Temperature ($T_m$)

Referring to the procedures set forth in ASTM D3418-15 (published in 2015), a respective one of the carbon nanodot-fluorescent polymer composite particles of EX1 to EX4, the polyethylene terephthalate partially oriented yarn of CAE1, and carbon nanodot-fluorescent partially oriented yarns of AE1 and AE2 was subjected to glass transition temperature analysis and determination of melting temperature using a differential scanning calorimeter (DSC) (Manufacturer: Mettler-Toledo International Inc.; Model: DSC Q20). A test temperature was raised from 50° C. to 300° C. at a heating rate of 20° C./minute. The results are shown in Tables 1 and 2.

3. Acid Value

The carbon nanodot-fluorescent polymer composite particles of EX1 to EX4 were subjected to measurement of acid value according to the procedures set forth in ASTM D7409-15 (published in 2015), i.e., Standard Test Method for Carboxyl End Group Content of Polyethylene Terephthalate (PET) Yarns. The results are shown in Table 1.

4. Chromaticity (CIELAB Color Space) and Color Index

The carbon nanodot-fluorescent polymer composites of CE1 and CE2, the carbon nanodot-fluorescent polymer composite particles of EX1 to EX4, the polyethylene terephthalate partially oriented yarn of CAE1, and carbon nanodot-fluorescent partially oriented yarns of AE1 and AE2 were subjected to chromaticity (CIELAB color space) analysis and color index determination using a bench-top spectrophotometer (Manufacturer: HunterLab; Model no.: ColorQuest® XE). The results are shown in Tables 1 and 2.

5. Fluorescence Spectroscopy

Figure 2:
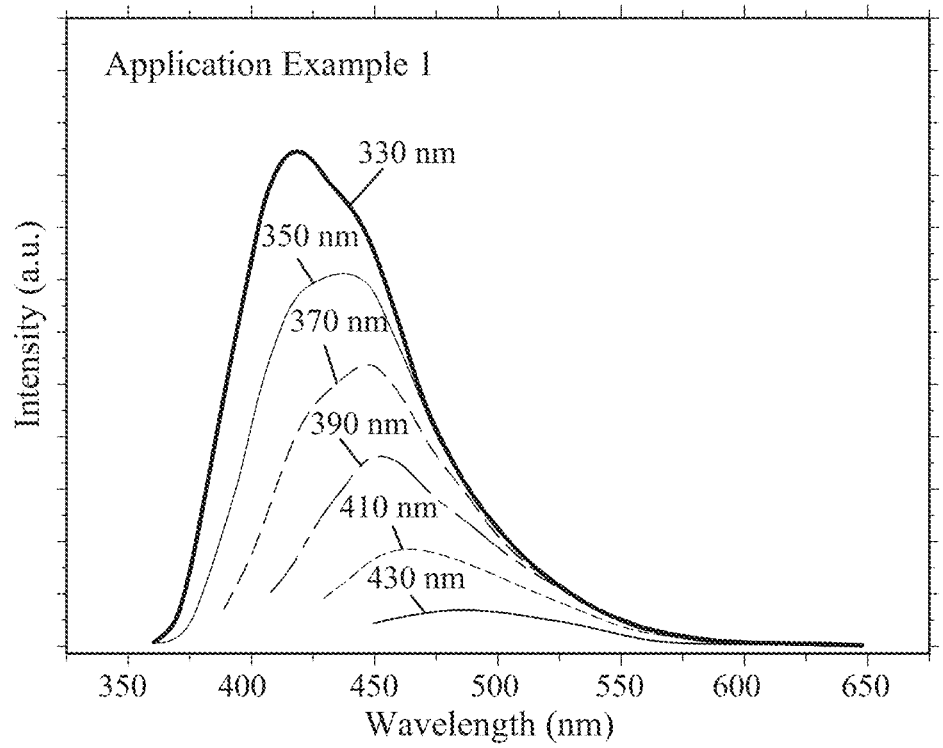
FIG. 2 is a graph illustrating fluorescence spectrum of a partially oriented yarn of Application Example 1 which was made from the carbon nanodot-fluorescent polymer composite particles of Example 1.
Figure 3:
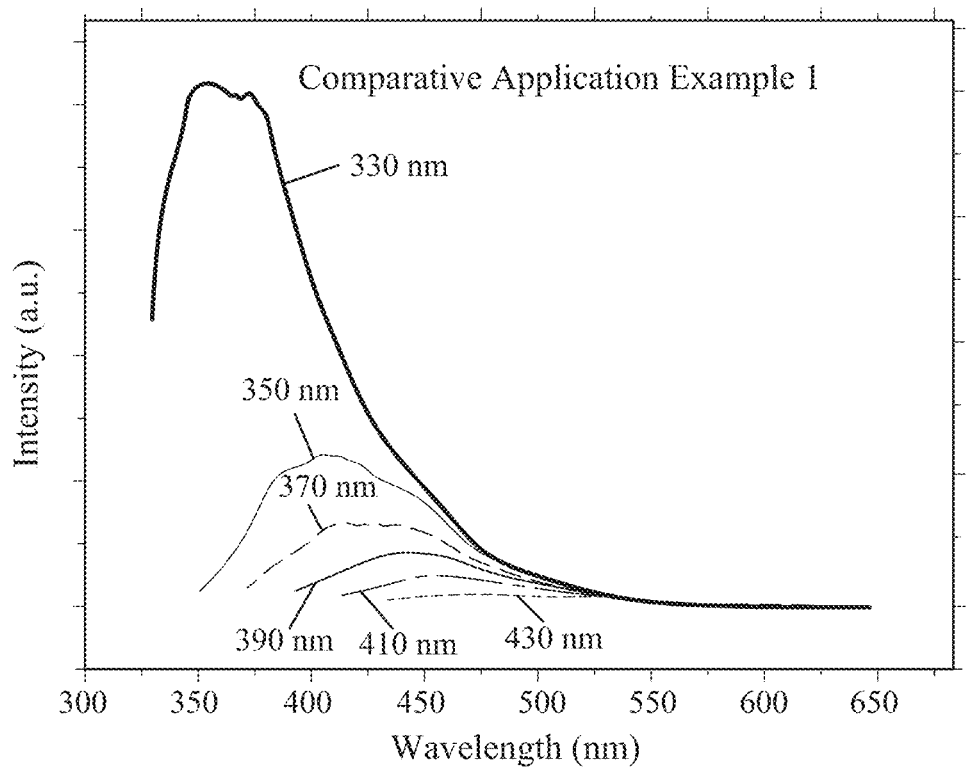
FIG. 3 is a graph illustrating fluorescence spectrum of a partially oriented yarn of Comparative Application Example 1 which was made from polyethylene terephthalate.

The optical properties of each of the carbon nanodot-fluorescent polymer composite particles of EX1, the polyethylene terephthalate partially oriented yarn of CAE1, and carbon nanodot-fluorescent partially oriented yarn of AE1 were determined using a fluorescence spectrometer (Manufacturer: PerkinElmer, Inc.; Model no.: LS-55). The results are shown in FIGS. 1 to 3.

6. Microscopy Imaging

For each of the carbon nanodot-fluorescent polymer composites of CE1 and CE2 and the carbon nanodot-fluorescent polymer composite particles of EX1 to EX4, the appearance thereof was observed and photographed under an optical microscope (Manufacturer: Olympus Corporation; Model no.: BX40) at a magnification of 40×. In addition, the carbon nanodot-fluorescent polymer composite particles of EX1 was subjected to imaging and photography using a transmission electron microscope (Manufacturer: Koninklijke Philips N.V.; Model no.: FEI Tecnai™ G2 F20 Field Emission Gun-STEM) and DigitalMicrograph® image analysis software (Developer: Gatan, Inc.), so as to determine the crystal lattice spacing of the carbon nanodots therein. The results are shown in FIGS. 4 to 11.

Results

FIGS. 1 to 3 illustrate fluorescence spectra of the carbon nanodot-fluorescent polymer composite particles of EX1, the carbon nanodot-fluorescent partially oriented yarn of AE1, and the polyethylene terephthalate partially oriented yarn of CAE1, respectively, under excitation lights having different wavelengths. As shown in FIGS. 1 to 3, the carbon nanodot-fluorescent polymer composite particles of EX1 and the carbon nanodot-fluorescent partially oriented yarn of AE1 made from the carbon nanodot-fluorescent polymer composite particles of EX1 had peak emission wavelengths ranging from 400 nm to 470 nm, whereas the polyethylene terephthalate partially oriented yarn of CAE1 which did not contain carbon nanodots had a peak emission wavelength ranging from 350 nm to 425 nm. In addition, with an increase in the wavelength of the excitation lights, the peaks of the peak emission wavelengths for the carbon nanodot-fluorescent polymer composite particles of EX1 and the carbon nanodot-fluorescent partially oriented yarn of AE1 made from the carbon nanodot-fluorescent polymer composite particles of EX1 demonstrated a redshift phenomenon, indicating that the method for preparing a carbon nanodot-fluorescent polymer composite according to the present disclosure can indeed prepare a carbon nanodot-fluorescent polymer composite containing carbon nanodots.

Figure 4:
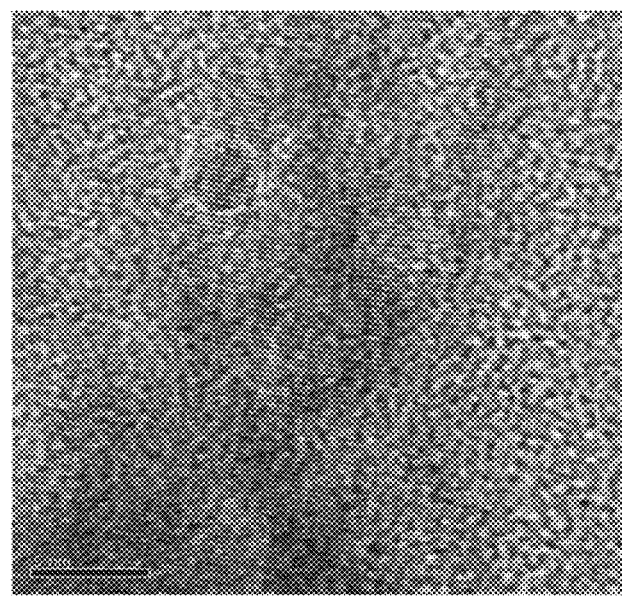
FIG. 4 is a transmission electron microscopy image showing the carbon nanodot-fluorescent polymer composite particles of Example 1.
Figure 5:
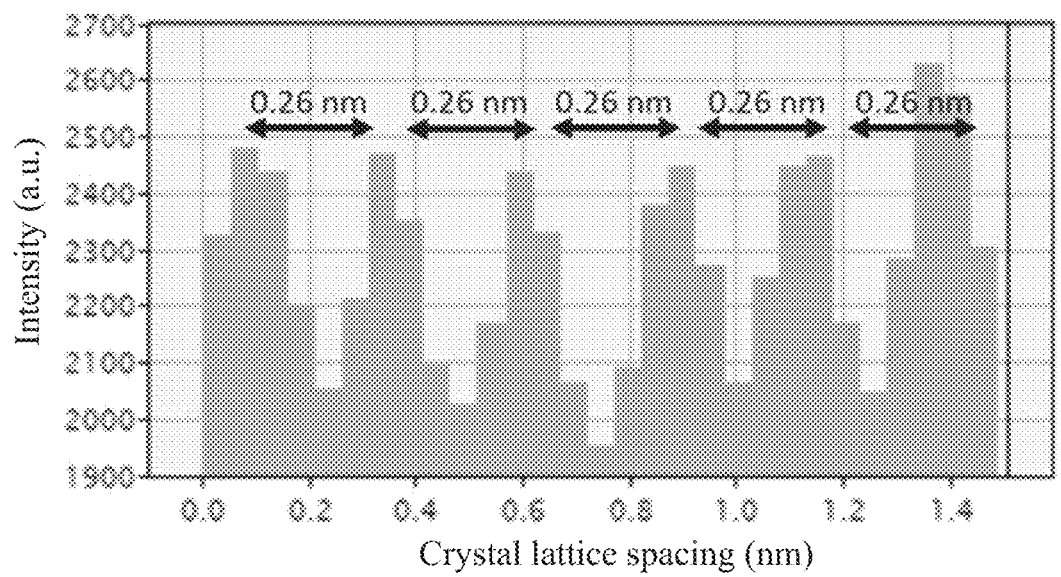
FIG. 5 is a graph illustrating crystal lattice spacing of carbon nanodots of the carbon nanodot-fluorescent polymer composite particles of Example 1.
Figure 6:
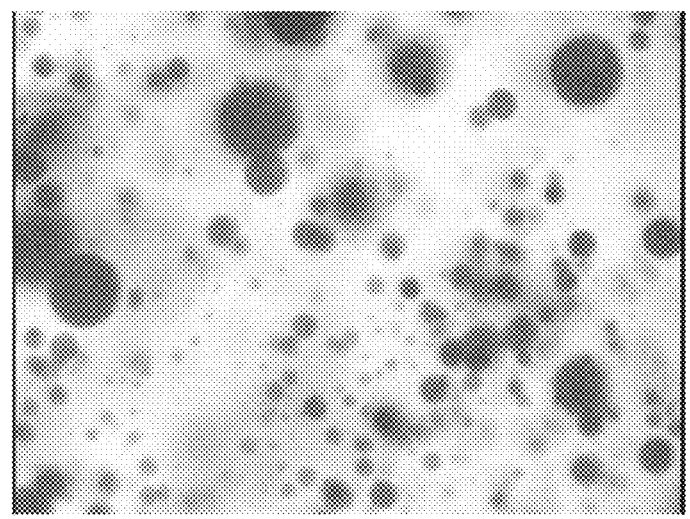
FIG. 6 is an optical microscopy image of the carbon nanodot-fluorescent polymer composite of Comparative Example 1.
Figure 7:
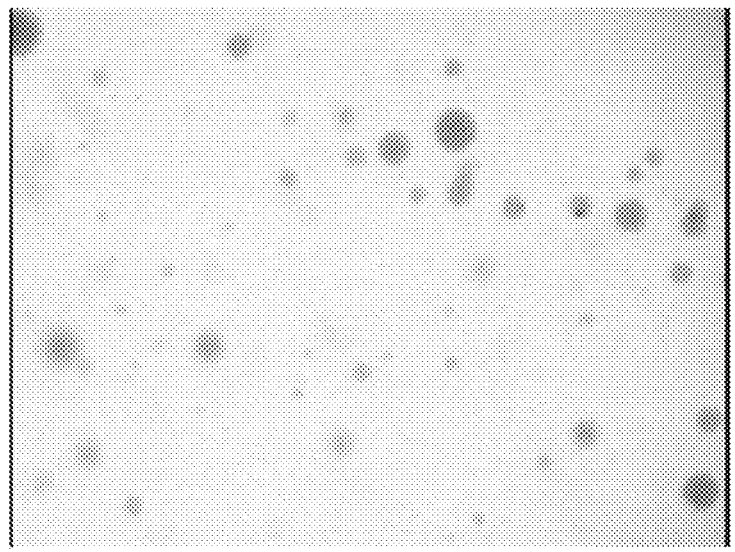
FIG. 7 is an optical microscopy image of the carbon nanodot-fluorescent polymer composite of Comparative Example 2.
Figure 8:
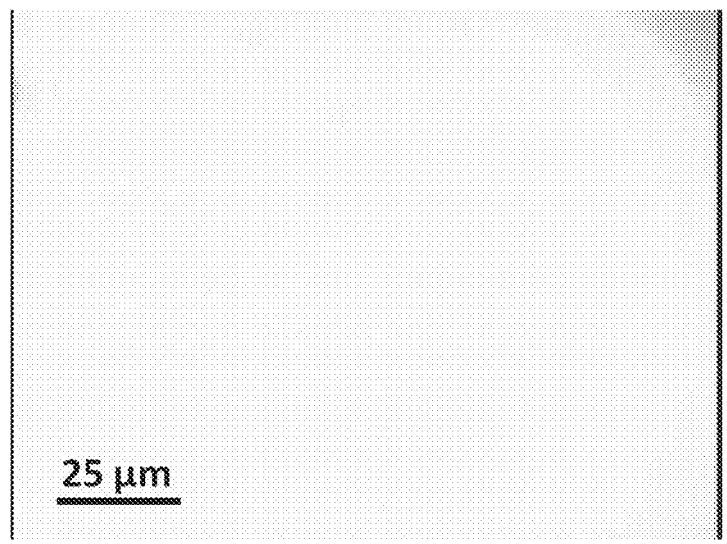
FIG. 8 is an optical microscopy image of the carbon nanodot-fluorescent polymer composite particles of Example 1.
Figure 9:
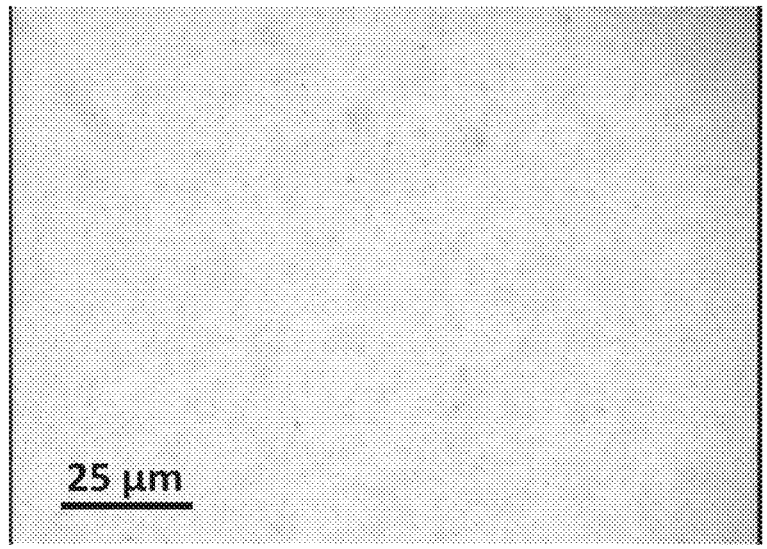
FIG. 9 is an optical microscopy image of the carbon nanodot-fluorescent polymer composite particles of Example 2.
Figure 10:
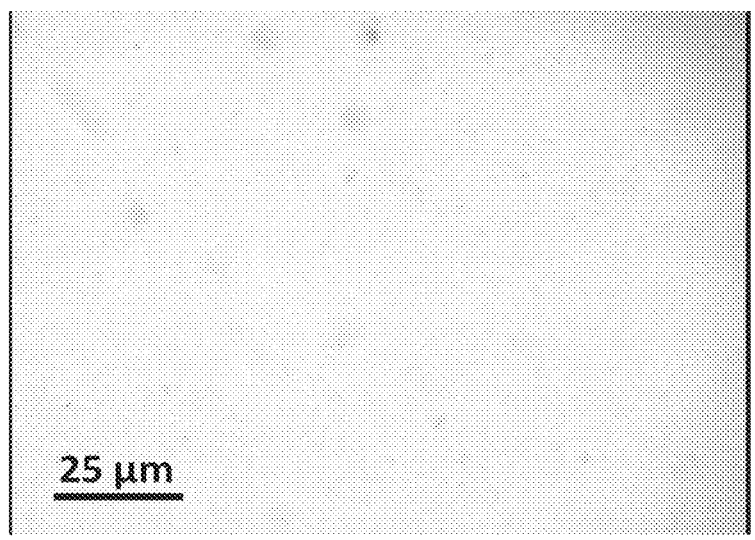
FIG. 10 is an optical microscopy image of the carbon nanodot-fluorescent polymer composite particles of Example 3.
Figure 11:
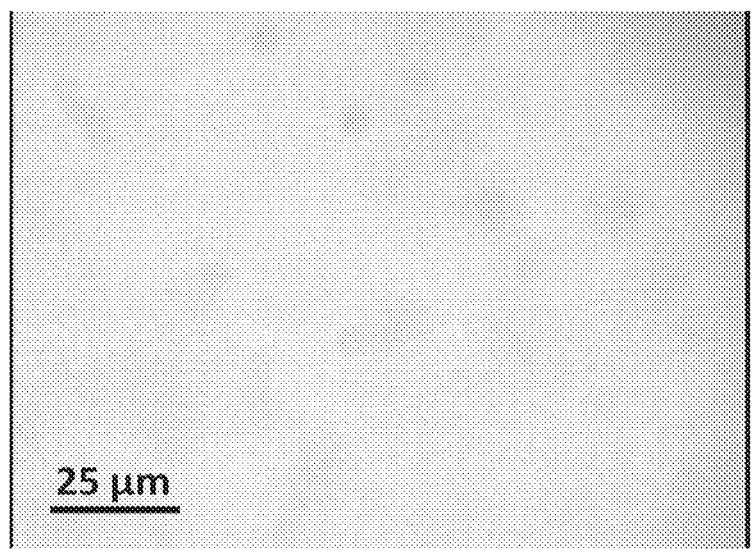
FIG. 11 is an optical microscopy image of the carbon nanodot-fluorescent polymer composite particles of Example 4.

FIG. 4 is a transmission electron microscopy image showing the carbon nanodot-fluorescent polymer composite particles of EX1, and FIG. 5 is a graph showing a result of measurement of crystal lattice spacing of the carbon nanodots of the carbon nanodot-fluorescent polymer composite particles of EX1 taken along the dotted circled area of FIG. 4. As shown in FIGS. 4 and 5, the unit cells in the crystal lattice of the carbon nanodots of the carbon nanodot-fluorescent polymer composite particles of EX1 had a regular arrangement, the average particle size of the carbon nanodots was 2.4±0.2 nm, and the d-spacing of the crystal lattice was 0.26 nm.

TABLE 1

| Property evaluation | | Carbon nanodot-fluorescent polymer composite | | | | | |
|---|---|---|---|---|---|---|---|
| | | EX1 | EX2 | EX3 | EX4 | CE1 | CE2 |
| Appearance | Color | Transparent brown | | | Black | | White |
| | Grainy characteristics | None | | | | | Presence of black particles |

TABLE 1-continued

| | | Carbon nanodot-fluorescent polymer composite | | | | | |
|---|---|---|---|---|---|---|---|
| Property evaluation | | EX1 | EX2 | EX3 | EX4 | CE1 | CE2 |
| Chromaticity (color space) | Lightness, L | 32.1 | 33.86 | 29.8 | 30.2 | 76.5 | 79.9 |
| | Green-red opponent colors, a | 2.3 | 2.21 | 0 | 0.1 | 0.4 | −0.3 |
| | Blue-yellow opponent colors, b | 2.1 | 2.57 | −0.7 | −0.4 | 6.1 | 4.2 |
| Color index (%) | | −13.9 | −14.9 | 5.7 | 3.8 | −12.6 | −7.4 |
| Glass transition temperature, $T_g$ (° C.) | | 79.8 | 80.8 | 76.1 | 76.0 | — | — |
| Melting temperature, $T_m$ (° C.) | | 253.8 | 250.9 | 250.9 | 254.2 | — | — |
| Intrinsic viscosity, IV (dL/g) | | 0.62 | 0.63 | 0.60 | 0.59 | — | — |
| Acid value (eq KOH/$10^6$ g) | | 36.9 | 27.1 | 38.7 | 14.6 | — | — |

"—": not determined

As shown in Table 1, with regard to the appearance of the carbon nanodot-fluorescent polymer composites of CE1 and CE2, and that of the carbon nanodot-fluorescent polymer composite particles of EX1 to EX4, the carbon nanodot-fluorescent polymer composites of CE1 and CE2 prepared using a conventionally known method (i.e., by mixing carbon nanodots with a polymer) showed clusters of carbon nanodot aggregates, resulting in a significant grainy appearance. In addition, as shown by the optical microscopy images of FIGS. 6 and 7, the carbon nanodots in each of the carbon nanodot-fluorescent polymer composites of CE1 and CE2 formed circular-shaped clusters of aggregates which appeared as black particles, indicating that such carbon nanodots were not uniformly dispersed in the polymer (i.e., polyethylene terephthalate). In contrast, for the carbon nanodot-fluorescent polymer composite particles of EX1 to EX4, since the carbon nanodots were formed along with the polymer, clusters of carbon nanodots aggregates would not be present, and thus, the carbon nanodot-fluorescent polymer composite particles of EX1 to EX4 would not have a grainy appearance. In addition, as shown by the optical microscopy images of FIGS. 8 to 11, the carbon nanodots in each of the granular-shaped carbon nanodot-fluorescent polymer composite particles of EX1 to EX4 did not aggregate, and were uniformly dispersed in the polymer, indicating that in the carbon nanodot-fluorescent polymer composite prepared by the preparation method of the present disclosure, the carbon nanodots are indeed uniformly dispersed in the polymer.

TABLE 2

| | | Partially oriented yarn | | |
|---|---|---|---|---|
| Property evaluation | | CAE1 | AE1 | AE2 |
| Chromaticity (color space) | Lightness, L | 89.0 | 89.2 | 72.4 |
| | Green-red opponent colors, a | −0.9 | −0.7 | 2.6 |
| | Blue-yellow opponent colors, b | 4.0 | 4.5 | 13.5 |
| Color index (%) | | −3.4 | −6.8 | −33 |
| Glass transition temperature, $T_g$ (° C.) | | 78.5 | 76.0 | 79.3 |
| Melting temperature, $T_m$ (° C.) | | 252.7 | 254.6 | 255.7 |
| Intrinsic viscosity, IV (dL/g) | | 0.63 | 0.56 | 0.56 |

As shown in Table 2, each of the partially oriented yarns of AE1 and AE2 prepared by mixing the carbon nanodot-fluorescent polymer composite particles of the present disclosure with polyethylene terephthalate according to the preparation method of the present disclosure had a chromaticity which was comparable with the chromaticity of the partially oriented yarn of CAE1 made from polyethylene terephthalate. This result indicates that in the carbon nanodot-fluorescent polymer composite particles prepared by the preparation method of the present disclosure, the carbon nanodots are indeed uniformly dispersed in the polymer, and thus, the partially oriented yarn prepared by mixing the carbon nanodot-fluorescent polymer composite particles of the present disclosure with polyethylene terephthalate can better exhibit the original properties of the polyethylene terephthalate in terms of color and luster.

In summary, by virtue of subjecting the reactant and the biological component to the reaction so as to simultaneously form the carbon nanodots and the polymer, the carbon nanodots in the thus obtained carbon nanodot-fluorescent polymer composite prepared by the method of the present disclosure can be uniformly dispersed in the polymer, such that the carbon nanodot-fluorescent polymer composite does not have a grainy appearance.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for preparing a carbon nanodot-fluorescent polymer composite, comprising:
    subjecting a reactant and a biological component to a reaction, so as to obtain the carbon nanodot-fluorescent polymer composite containing a polymer and a plurality of carbon nanodots dispersed in the polymer, the polymer being formed from the reactant, and the carbon nanodots being transformed from the biological component, wherein the reaction is performed at a temperature ranging from 260° C. to 290° C., wherein the biological component includes at least one biological substance selected from the group consisting of collagen, chitin, gelatin, and sodium alginate, and wherein the reactant is selected from one of a reaction component and a polycondensate formed by subjecting the reaction component to a condensation reaction, the reaction component including terephthalic acid and ethylene glycol capable of reacting with carboxylic acid groups of the terephthalic acid.

2. The method as claimed in claim 1, wherein the collagen has a weight average molecular weight ranging from 110 kDa to 500 kDa.

3. The method as claimed in claim 1, wherein the chitin has a weight average molecular weight ranging from 800 kDa to 1500 kDa.

4. The method as claimed in claim 1, wherein the gelatin has a weight average molecular weight ranging from 20 kDa to 100 kDa.

5. The method as claimed in claim 1, wherein the sodium alginate has a weight average molecular weight ranging from 20 kDa to 200 kDa.

6. The method as claimed in claim 1, wherein in the carbon nanodot-fluorescent polymer composite, the carbon nanodots are present in an amount ranging from 0.00001 parts by weight to 5 parts by weight, based on a total amount of the polymer defined as 100 parts by weight.

7. A carbon nanodot-fluorescent polymer composite, which is prepared by a method as claimed in claim 1, and which has a glass transition temperature ranging from 76° C. to 100° C.

8. The carbon nanodot-fluorescent polymer composite as claimed in claim 7, which has a glass transition temperature ranging from 76° C. to 90° C.

9. The carbon nanodot-fluorescent polymer composite as claimed in claim 7, which has an acid value not greater than 40 eq $KOH/10^6$ g.

10. A carbon nanodot-fluorescent composite fiber, comprising a polymer composite component which includes a carbon nanodot-fluorescent polymer composite as claimed in claim 7.

11. The carbon nanodot-fluorescent composite fiber as claimed in claim 10, wherein the polymer composite component further includes an organic polymer.

12. The carbon nanodot-fluorescent composite fiber as claimed in claim 11, wherein the organic polymer is selected from the group consisting of polyethylene terephthalate, polybutylene terephthalate, polytrimethylene terephthalate, polyamide, and combinations thereof.

* * * * *